(12) United States Patent
Forehand et al.

(10) Patent No.: US 6,516,426 B1
(45) Date of Patent: Feb. 4, 2003

(54) DISC STORAGE SYSTEM HAVING NON-VOLATILE WRITE CACHE

(75) Inventors: Monty A. Forehand, Yukon, OK (US); Mark A. Heath, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/333,315

(22) Filed: Jun. 14, 1999

Related U.S. Application Data

(60) Provisional application No. 60/115,412, filed on Jan. 11, 1999.

(51) Int. Cl.$^7$ .................................................. G06F 11/00
(52) U.S. Cl. ........................................ 714/24; 711/113
(58) Field of Search .......................... 714/2, 4, 5, 14, 714/15, 24; 711/113, 112; 369/30.23; 710/6

(56) References Cited

U.S. PATENT DOCUMENTS

| | | | | |
|---|---|---|---|---|
| 3,351,914 A | * | 11/1967 | Stone | 711/112 |
| 5,091,680 A | | 2/1992 | Palm | 318/368 |
| 5,363,355 A | | 11/1994 | Takagi | 369/32 |
| 5,377,094 A | | 12/1994 | Williams et al. | 363/132 |
| 5,396,384 A | * | 3/1995 | Caldeira et al. | 360/98.01 |
| 5,448,719 A | | 9/1995 | Schultz et al. | 395/182.03 |
| 5,508,874 A | | 4/1996 | Williams et al. | 361/92 |
| 5,519,831 A | | 5/1996 | Holzhammer | 395/182.2 |
| 5,572,660 A | | 11/1996 | Jones | 395/182.04 |
| 5,584,007 A | | 12/1996 | Ballard | 395/440 |
| 5,586,291 A | | 12/1996 | Lasker et al. | 395/440 |
| 5,588,129 A | | 12/1996 | Ballard | 395/440 |
| 5,764,945 A | | 6/1998 | Ballard | 395/440 |
| 5,787,460 A | | 7/1998 | Yashiro et al. | 711/114 |
| 5,806,085 A | * | 9/1998 | Berliner | 711/113 |
| 5,889,629 A | | 3/1999 | Patton, III | 360/75 |
| 6,223,247 B1 | * | 4/2001 | Otsuka et al. | 711/112 |
| 6,295,577 B1 | * | 9/2001 | Anderson et al. | 711/113 |

* cited by examiner

Primary Examiner—Robert Beausoleil
Assistant Examiner—Marc Duncan
(74) Attorney, Agent, or Firm—Westman, Champlin & Kelly

(57) ABSTRACT

A disc storage system having a host computer interface adapted to coupled to a host computer, a disc storage medium having a disc surface and a spindle motor coupled to the disc adapted to rotate the disc. The disc includes spare data regions and permanent data regions. A transducer is positioned for reading and writing data on the disc surface. The system further includes a controller adapted to write data on the spare data regions to thereby provide a non-volatile write cache.

17 Claims, 4 Drawing Sheets

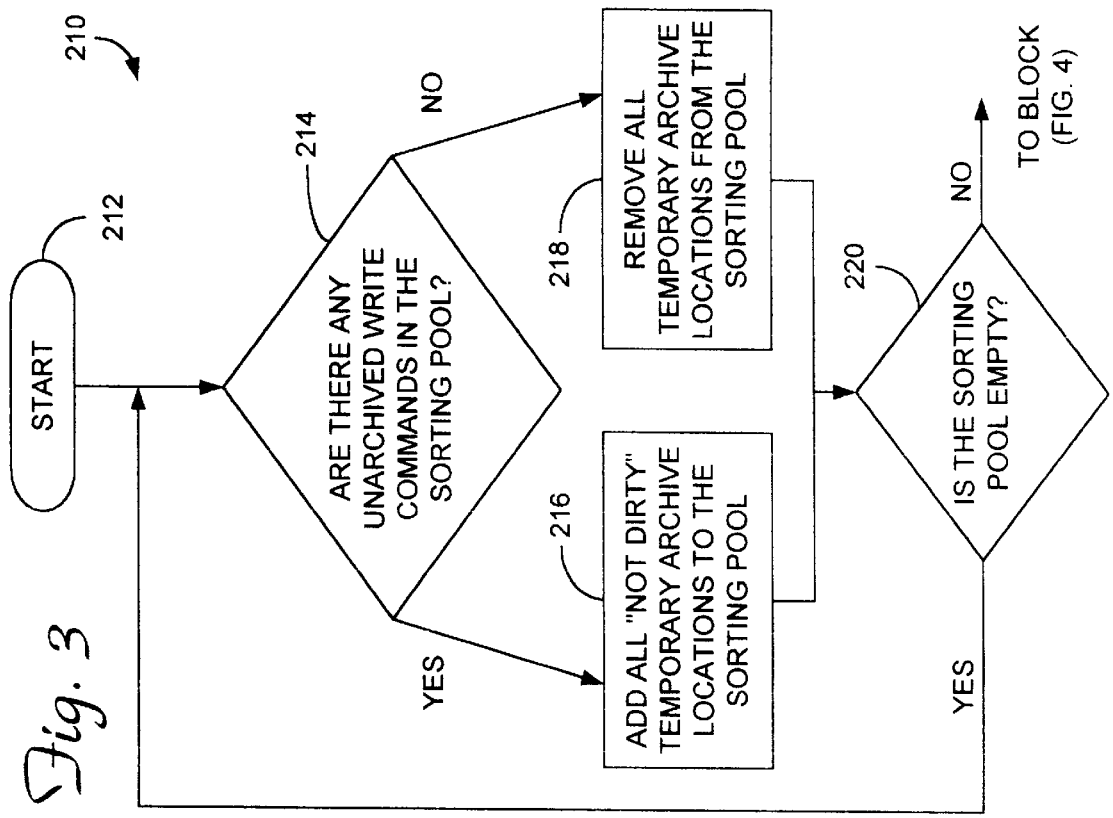
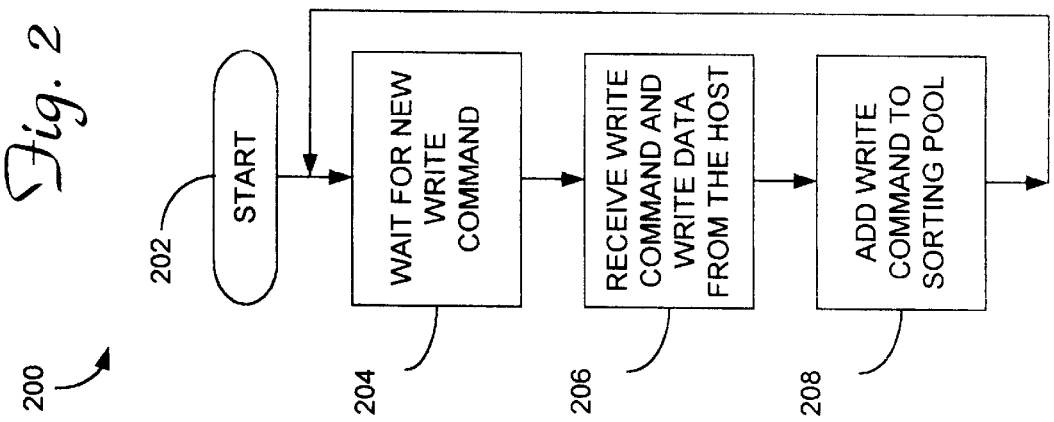

DISC STORAGE SYSTEM HAVING NON-VOLATILE WRITE CACHE

REFERENCE TO CO-PENDING APPLICATION

The present invention claims priority to Provisional Application Serial No. 60/115,412, filed Jan. 11, 1999 and entitled NON-VOLATILE WRITE CACHE USING SPARE DISC DRIVE REGIONS.

FIELD OF THE INVENTION

The present invention relates to disc storage systems. More specifically, the present invention relates to a write cache for disc storage system.

BACKGROUND OF THE INVENTION

Disc storage systems, such as magnetic or optical disc storage systems, are used to store information for subsequent retrieval. The speed at which information can be written to the disc is determined by a number of physical constraints. For example, if the transducer which is used to write information on the disc surface is positioned over one area of the disc, and data is to be written at another area of the disc, the transducer must be physically moved between annular data tracks across the disc surface. Further, as the disc rotates, the write operation may be delayed until the disc rotates to the proper position.

The delay in writing information onto a disc surface can introduce delays in a host computer when writing to the disc. For example, the host computer must wait for the disc storage system to complete the write operation. One technique for reducing this waiting time is by using a write cache technique in which data is written into a data cache in the host computer. After the data has been written to the cache, the host computer can continue with subsequent operation and is not required to wait until the write operation is complete. The data is removed from the cache as it is needed by the disc and when it can be written onto the disc surface. The actual time at which the data is written to the disc is based upon a number of factors including seek time, rotational latency time, and the size of the write cache.

Caching techniques are frequently used for readback operations. However, write caching is often avoided because of the likelihood of lost data. For example, if there is a system crash or power failure prior to writing the data onto the disc surface and while the data is stored in the cache, the data can be lost or the disc data structure otherwise corrupted.

A number of techniques have been developed in which the host computer is responsible for write caching. Some such techniques include the use of non-volatile memory (NARAM) For example, U.S. Pat. No. 5,363,355, entitled CD-ROM DISC REPRODUCING APPARATUS WITH CLIPPING MEMORY, issued Nov. 8, 1994; U.S. Pat. No. 5,448,719, entitled METHOD AND APPARATUS FOR MAINTAINING AND RETRIEVING LIVE DATA IN A POSTED WRITE CACHE IN CASE OF POWER FAILURE, issued Sep. 5, 1995; U.S. Pat. No. 5,586,291, entitled DISK CONTROLLER WITH VOLATILE AND NON-VOLATILE CACHE MEMORIES, issued Dec. 17, 1996, and U.S. Pat. No. 5,519,831, entitled NON-VOLATILE DISK CACHE, issued May 21, 1996. These patents describe write caches which are controlled by the host computer and employ non-volatile memory. For example, an internal battery can be used to maintain the data in the memory in the event of a power loss. Upon subsequent power up, these references describe techniques to identify that there is cached data in the memory which must be written to the disc.

There are a number of problems and inefficiencies associated with these techniques. For example, battery powered memory is relatively expensive, usually 5 to 10 times the cost of dynamic random access memory (DRAM) which is typically used for volatile write caches. These techniques are implemented in the host computer which therefore require the host computer to be specially configured. Further, since the host computer is responsible for storing the data, data can still be lost at the disc drive level. These techniques also take processing time from the host computer to manage the cache.

The present invention addresses these and other problems, and offers other advantages over the prior art.

SUMMARY OF THE INVENTION

The present invention relates to disc drives which have an internal non-volatile memory cache which solves the above mentioned problems.

In accordance with one embodiment, the present invention includes a disc storage system having a host computer interface adapted to couple to a host computer, a disc storage medium having a disc surface with spare and permanent data regions and a spindle motor coupled to the disc adapted to rotate the disc. A transducer is positioned for reading and writing data on the disc surface. The system further includes a controller adapted to write data on the spare data regions to thereby provide a write cache. Another aspect of the invention includes a method for storing data in spare data regions on a disc surface prior to writing the data in permanent data regions.

These and various other features as well as advantages which characterize the present invention will be apparent upon reading of the following detailed description and review of the associated drawings.

BRIEF DESCRIPTION OF THE DRAWINGS

FIG. 2 is a simplified block diagram flow chart showing steps for receiving and caching data in the storage system of FIG. 1.

FIG. 3 is a simplified block diagram flow chart showing steps for writing data from a cache in the storage system of FIG. 1.

DETAILED DESCRIPTION OF THE PREFERRED EMBODIMENTS

Figure 1:
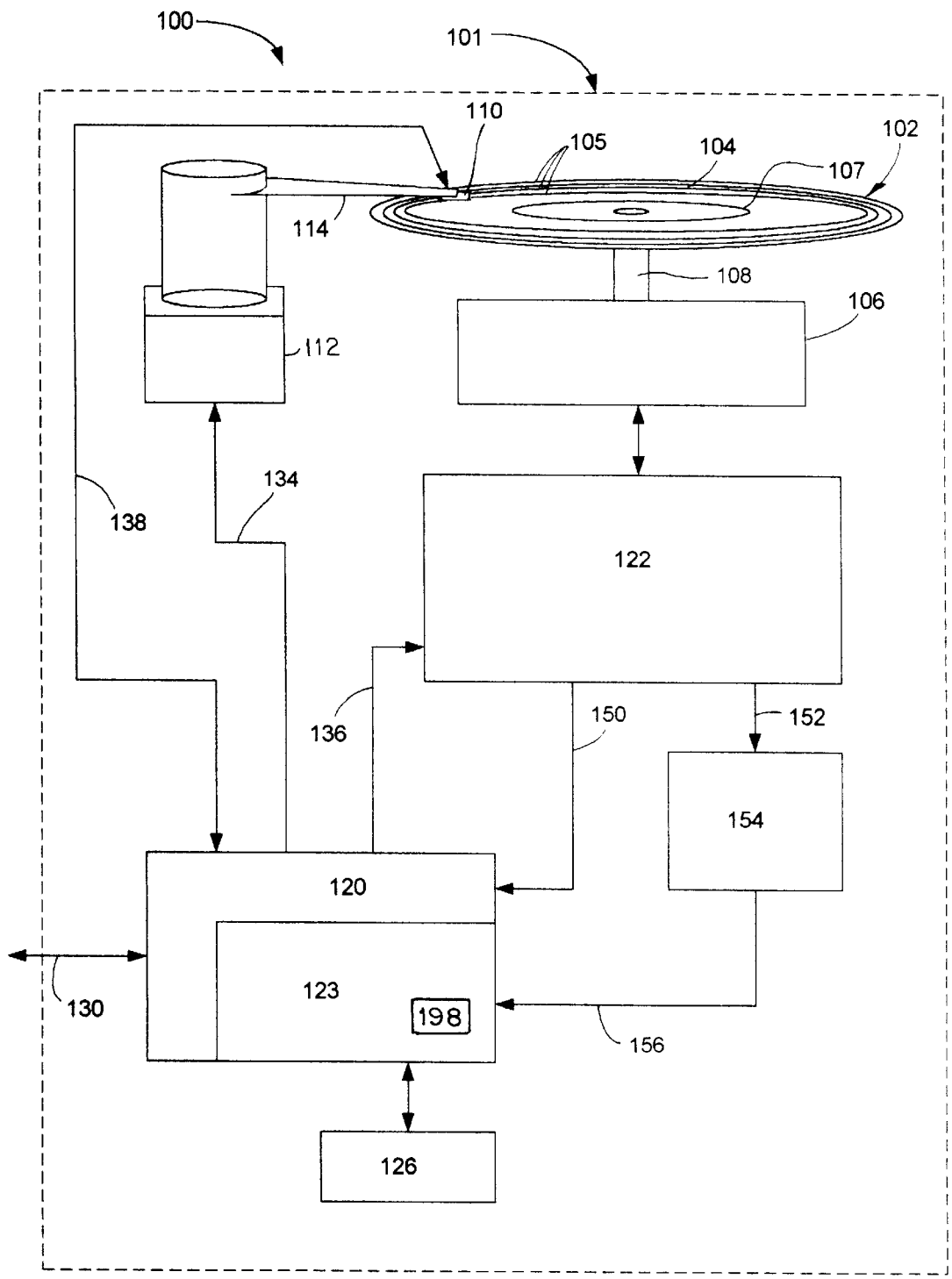
FIG. 1 is a simplified diagram of a disc storage system including a non-volatile memory cache in accordance with the present invention.

Referring now to FIG. 1, a simplified block diagram of a disc storage system 100 is shown in accordance with one embodiment of the present invention. A system like disc storage system 100 includes housing 101, disc storage medium 102 having a data surface 104. Surface 104 includes permanent data regions 105 and spare data regions 107 in accordance with one aspect of the invention. Disc 102 is coupled to spindle motor 106 through spindle 108. A transducing head 110 is positioned relative to surface 104 for reading and writing information onto surface 104. Transducer 110 is coupled to actuator 112 through actuator arm 114. Transducer 110 can read and write information of a desired location on surface 104 by moving transducer 110 with actuator 112 in a manner to position transducer 110 radially while disc 102 rotates.

System 100 further includes controller and write cache circuitry 120 and motor control circuitry 122. Controller and write cache 120 include caching circuitry 123 coupled to non-volatile memory write cache 126. In one preferred embodiment, the non-volatile memory write cache 126 is capable of storing information for a period of up to 10 years. Controller and write cache 120 further couples to a host computer interface 130 which may comprise any type of data exchange interface for coupling to a disc Controller in a host computer such as SCSI (Small Computer System Interface), UDMA (Ultra Direct Memory Access), ATA (Advanced Technology Attachment), or other standards as are known in the industry or are developed in the future.

Controller 120 controls the radial position of transducer 110 by energizing actuator 112 over control connection 134. Further, controller 120 controls operation of motor 106 by controlling motor controller 122 over control connection 136. Thus, controller 120 can position transducer 112 to substantially any desired location on disc surface 104. Once positioned, information can be read from, or written to, disc surface 104 by sending or receiving data through read/write channel 138 which couples control circuitry 120 to transducer 110.

The present invention provides a non-volatile write caching technique in which data is cached on the disc surface at spare data regions 107 prior to writing the data in a more permanent location at permanent data regions 105. This allows the cached data to be written to a more permanent location at a more opportune time, such as during drive idle periods or when the read/write head is close to a desired location on the medium. For example, if there are five incomplete write commands for writing data to disc tracks 100, 7000, 900, 15000 and 500, the total number of tracks which would need to be crossed in order to write this data sequentially is 6900+6100+14100+14500=41600 tracks. However, if the data is cached and written in the most efficient order (track 100, 500, 900, 7000 and 15000), then the total number of tracks to be crossed during seeking is 400+400+6100+8000=14900 tracks.

As discussed above, the data is volatile until it is written onto the medium. Prior art write caching techniques have typically required a non-volatile electric type storage and may require a backup battery to maintain the write cache during a power failure so that the writing operation can be completed upon power up. In accordance with one aspect of the present invention, write data is cached onto the disc surface such that the data is not lost if the power fails. More specifically, the data is written on spare data regions 107 which are spaced at intervals across the disc. In one preferred embodiment, there are 16 spare data regions spaced across the disc surface each containing one track of available spare storage. However, the data regions can be interspersed across the disc surface in any desired mariner and at any desired location or frequency. For example, the data regions can take up portions of certain data tracks on the surface 104 of disc 102 shown in FIG. 1.

Preferably, aspects of the invention are implemented in firmware. For example, circuitry to determine a preferable time to move cache data to a more permanent location and detection of cache data upon power up such that the data may be written at its more permanent location can be implemented in firmware. Typically, a small non-volatile memory, such as non-volatile memory 126, is implemented for storing information related to cached data during a power loss.

In one aspect of the invention, cached data stored in a spare data region 107 is deleted immediately after the data has been written to a permanent data region 105. Furthermore, upon power up after a power failure, controller 120 reads all cached data from the spare data regions 107 and writes the data at the appropriate permanent data region 105. Even if power is lost during the process of deleting data on the spare data region 107 following writing data to a permanent data region 105 (i.e., before that cache has been emptied), the spare and permanent data regions 105 and 107 will contain the same data and therefore no information will be lost.

In a second embodiment of the invention, data from a generation counter 198 is embedded with each write operation to allow controller 120 to determine whether the most recent write operation was for writing data to a temporary location 107 or a permanent location 105. This generation counter can be embedded as an error correcting code (ECC) seed, or encoded with the data, causing little or no overhead. Each time a write operation is performed, the generation counter is incremented. The generation counter must maintain its count during its power downs and is preferably a 64 bit number stored in a non-volatile memory 126. At power down, or other loss of power, the back electromotive force (EMF) of motor 106 can be used to store the generation counter in non-volatile memory 126 as described in co-pending application Ser. No. 09/255,473, filed Feb. 23, 1999. During a loss of power, a back EMF signal 152 is provided from motor control circuits 122 to voltage regulator 154. Voltage regulator 154 provides a power down power supply 156. A power condition connection 150 is provided to caching circuitry 123 from motor control circuit 122. The generation counter can be stored in ferro RA random access memory (RAM) EEPROM backed SRAM system flash memory, or other appropriate types of non-volatile memory.

FIG. 2 is a simplified block diagram 200 showing steps performed by controller 120 for adding data to the write cache. At block 202, the procedure is initiated and at block 204 controller 120 waits for receipt of a write command through interface 130. At block 206, a write command is received by controller 120 along with the write data from the host computer (not shown). At block 208, the write command is added to a sorting pool in controller 120 and control is returned to block 204 which waits for receipt of a new write command through interface 130. The sorting pool can be formed using memory fin controller 120 which is sorted as set forth herein during periods of relative inactivity of controller 120.

FIG. 3 is a simplified block diagram 210 showing steps used for writing data to the disc surface 104. The procedure is initiated at start block 212 and control is passed to block 214. If controller 120 determines that there are unarchived write commands in the sorting pool, control is passed to block 216. If, on the other hand, there are no write commands in the sorting pool, control is passed to block 218. At block 216, any "not dirty" (that is data which has not yet been permanently recorded). in temporary archive locations are added to the sorting pool. At block 218, all temporary archive locations are removed from the sorting pool. At block 220, if the sorting pool is empty, control is returned to block 214. If the sorting pool is not empty, control is passed to block 232 shown in FIG. 4.

Figure 4:
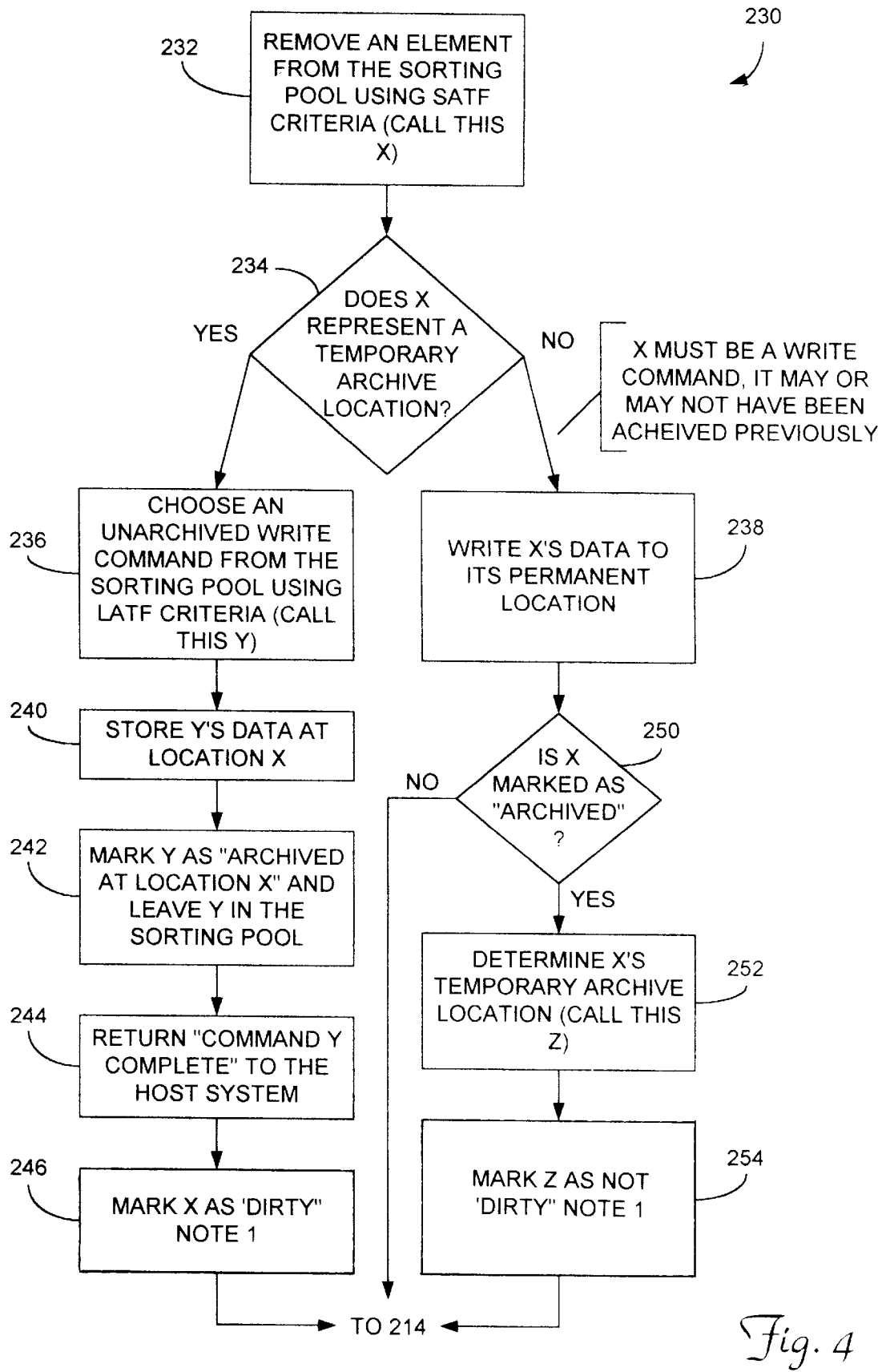
FIG. 4 is a simplified block diagram flow chart showing steps writing data to a non-volatile memory cache in the storage system of FIG. 1.

FIG. 4 is a simplified block diagram 230 showing steps for writing data to disc surface 104. Control is passed to block 232 from block 220 shown in FIG. 3 and an element (X) is removed from the sorting pool using a shortest access time first (SATF) sorting criteria and control is passed to decision block 234. If X represents a temporary archive location, control is passed to block 236. If, however, X does not represent a temporary archive location, X must be a write command which may or may not have been previously archived and control is passed to block 238. At block 236, an unarchived write command (Y) is retrieved from the sorting pool using a longest access time first (LATF) sorting criteria and control is passed to block 240 where Y's data is stored at location X. At block 242 the write command Y is marked as having been "archived at location X" and Y is left in the sorting pool. At block 244, a "command Y complete" message is returned to the host computer system (not shown) over interface 130 shown in FIG. 1. At block 246, X is marked as being "dirty" and control is returned to block 214 shown in FIG. 3.

If control is passed to block 238 from block 234, X's data is written to its permanent location and control is passed to comparison block 250. If X is not marked as having been archived, control is passed to block 214. If, on the other hand, X has been archived, control is passed to block 252 and X's temporary archive location (Z) is determined. Control is passed to block 254 and Z is marked as "not dirty". Control is returned to block 214.

Figure 5:
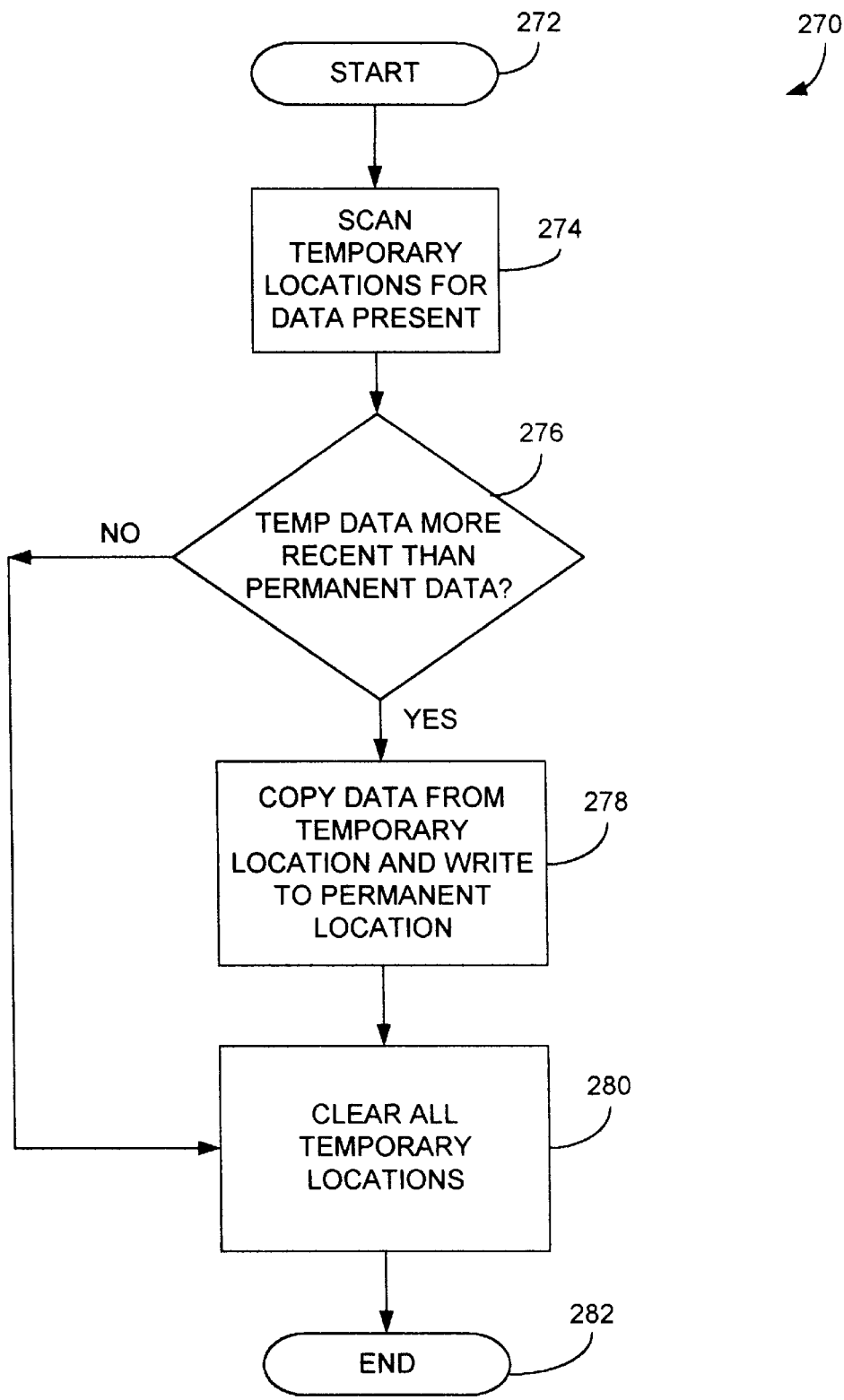
FIG. 5 is a simplified block diagram flow chart showing steps for retrieving data from a non-volatile memory cache in the storage system of FIG.

FIG. 5 is a simplified block diagram 270 showing steps during power up in accordance with another aspect of the present invention. Block diagram 270 starts at block 272 and control is passed to block 274 where controller 120 scans the spare data regions 107 for the presence of data. At block 276, if data in the spare regions 107 is more recent than data in the permanent regions 105, control is passed to block 278 where the temporary data is written to its appropriate permanent data region. At block 280, all spare data regions 207 are cleared and the process ends at process 282.

In the present invention, the caching will cause some write commands to result in two write operations to the disc surface 104. However, the worst case performance of the invention is still better than a cache-less technique. This performance improvement is due to a reduction in seek times of almost ⅓. The invention also has the benefit of adding very little cost to disc drive system 100. The only cost increase is for the additional non-volatile memory 126 to hold the generation counter. The spare data regions, at preferred densities, are substantially insignificant to the overall drive/loss capacity. In the example, only 16 tracks are lost out of the tens of thousands of tracks on a typical disc.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the non-volatile cache while maintaining substantially the same functionality without departing from the scope and spirit of the present invention. Further, although the invention has been illustrated as implemented in circuitry blocks, those skilled in the art will recognize that the invention may be implemented in any hardware, software or hybrid systems.

What is claimed is:

1. A disc storage system, comprising:
   (a) a rotatable storage disc having spare data regions and permanent data regions on a disc surface, the spare data regions comprise data tracks, and the data tracks are spaced across the disc surface;
   (b) a spindle motor operably coupled to the disc which is adapted to rotate the disc;
   (c) a transducer adapted for reading and writing data on the disc surface; and
   (d) a controller in the storage system adapted to receive data from a host computer interface, temporarily cache the data in the spare data regions on the disc surface and subsequently write the data to permanent data regions on the disc surface with the transducer to thereby provide a data write cache.

2. The disc storage system of claim 1 including a non-volatile memory cache in the disc storage system adapted to store information related to cached data during a power loss.

3. The disc storage system of claim 2 wherein the spindle motor generates a back EMF (ElectroMotive Force) signal upon loss of power, the back EMF signal is operatively coupled to the controller and the non-volatile memory to power the controller and the non-volatile memory upon loss of power supplied to the storage system.

4. The disc storage system of claim 3 including a voltage regulator which operatively couples the back EMF signal to the controller.

5. The disc storage system of claim 1 wherein the controller reads data from the spare data regions upon power up of the storage system.

6. The disc storage system of claim 5 wherein data read from the spare data regions is written to permanent data regions.

7. The disc storage system of claim 1 wherein the controller includes a generation counter and data from the generation counter is written to the disc surface during a write operation.

8. The disc storage system of claim 7 wherein the generation counter data is encoded with the write data.

9. The disc storage system of claim 8 wherein the generation counter data is stored in a non-volatile memory.

10. The disc storage system of claim 1 wherein there are 16 spare data tracks.

11. A method of caching data to be written to a disc storage medium in a disc storage system, comprising steps of:
    (a) receiving the data from a host computer;
    (b) writing the data in spare data regions on the disc medium, the spare data regions comprise data tracks, and the data tracks are spaced across the disc surface; and
    (c) retrieving the data from the spare data regions and writing the data to permanent storage regions on the disc storage medium.

12. The method of claim 11 including a step (d) of obtaining power for the writing step (b) from a back EMF (ElectroMotive Force) signal generated by a spindle motor of the disc storage system.

13. The method of claim 11 including steps of:
   (d) reading data from the spare data regions upon power up of the disc storage system; and
   (e) writing data read from the spare data regions to the permanent data regions.

14. The method of claim 11 including a step (d) of counting write operations with a generation counter.

15. The method of claim 14 including a step (e) of encoding data from the generation counter with data received from the host computer prior to writing the data to the data regions.

16. The method of claim 14 including a step (e) of storing data from the generation counter in a non-volatile memory.

17. A disc storage system which implements the method of claim 11.

* * * * *